United States Patent [19]

Sacks

[11] 3,988,534
[45] Oct. 26, 1976

[54] ELECTRO-OPTICAL TRACKING COMPUTER UTILIZING TELEVISION CAMERA

[75] Inventor: Jacob M. Sacks, Palos Verdes Peninsula, Calif.

[73] Assignee: Northrop Corporation, Los Angeles, Calif.

[22] Filed: July 28, 1969

[21] Appl. No.: 848,401

[52] U.S. Cl. ............................ 178/6.8; 178/DIG. 21
[51] Int. Cl.² ........................................... H04N 7/18
[58] Field of Search ....................... 178/6.8, DIG. 21

[56] References Cited
UNITED STATES PATENTS

| | | | |
|---|---|---|---|
| 2,970,187 | 1/1961 | Hinton ........................ | 250/203 CT |
| 3,043,907 | 7/1962 | Martin ........................ | 178/DIG. 21 |
| 3,257,505 | 6/1966 | Van Wechel ................ | 178/DIG. 21 |
| 3,578,904 | 5/1971 | Dewey et al. ................ | 178/DIG. 36 |
| 3,728,478 | 4/1973 | Turner et al. ................ | 178/DIG. 21 |

OTHER PUBLICATIONS

Lowenstein—A Television System With Automatic Target Tracking Capability—SMPTE—vol. 76—Dec. 1967—pp. 1189–1192.

*Primary Examiner*—Howard W. Britton
*Attorney, Agent, or Firm*—Edward A. Sokolski

[57] ABSTRACT

A television camera is trained on a target to produce a video image thereof. The video signals are converted to unipolar form such that black to white and white to black contrast produces the same polarity video signals and these signals appropriately filtered so that only the desired target signals remain. A tracking gate is generated which automatically accommodates to the size of the selected target and forms an optical window which surrounds the target on a viewing screen. In an acquisition mode of operation, the operator brings the target so that it lies within the window at which time he initiates a "track" mode of operation whereupon error signals are generated as the target moves out of the window, these error signals being utilized in a servo system to slew the camera such as to maintain "lock-on".

16 Claims, 30 Drawing Figures

INVENTOR.
JACOB M. SACKS
BY
Sokolski & Wohlgemuth
ATTORNEYS

INVENTOR.
JACOB M. SACKS
BY
Sokolski & Wohlgemuth
ATTORNEYS

ELECTRO-OPTICAL TRACKING COMPUTER UTILIZING TELEVISION CAMERA

This invention relates to electro-optical target tracking computer systems, and more particularly to such a system utilizing a television camera as the optical sensor.

In tracking systems such as utilized in armament control applications, the use of a television camera as an optical sensor has been suggested in view of the fact that it involves a passive type of operation not as readily subject to counter measures as active systems such as radar. Further, the use of a television camera as a sensor is desirable in that it provides the operator with an actual picture of the target area so that while he is acquiring the target, he has a view of what lies ahead of him and is not psychologically made to feel that he is "flying blind", as in the situation where radar type displays are utilized.

Thus, the use of a television type target acquisition system has a number of advantages. The use of this type of device, however, poses several problems which are primarily related to the processing of the video signals received so that they can be effectively used to achieve an accurate tracking of the target.

A particular problem in this regard is related to the fact that the video signals can be of either polarity depending upon whether the target is light or dark as compared with the background. Further, depending upon the ambient light conditions, this polarity contrast often reverses itself so that, for example, a target from which the sun's rays are being reflected can at one moment appear light against a dark background, while several moments later when the target is shadowed by a cloud, it may appear dark against a light background. It is therefore essential for proper operation of this type of system that the video signals representing the target be processed so that they have a constant polarity with regard to the background regardless of ambient lighting conditions. A further problem encountered in a tracking system utilizing television video is the necessity for eliminating extraneous signals representing background and extraneous objects in the field of view so that unequivocal lock-on to the centroid of the target can be obtained when such target has been acquired within the tracking gate. It is also essential that this gate properly adapt itself to variations in the apparent size of the target as the tracking operation proceeds, thereby assuring that the target is properly held within the gate.

The system of this invention provides an electro-optical tracking system utilizing a television camera which provides the above enumerated features in its video processing to enable reliable and accurate target acquisition and tracking.

It is therefore the principal object of this invention to provide a passive electro-optical target tracking system utilizing a television camera which affords accurate and reliable target acquisition and tracking.

Other objects of this invention will become apparent as the description proceeds in connection with the accompanying drawings, of which:

Briefly described, the system of the invention utilizes a television camera which is trained on a target, means being provided to generate an optical window which is displayed on the television screen and forms a target tracking gate. The operator trains the camera until the target falls within the gate, at which time he manually initiates a tracking mode of operation. The video signals are fed from the television camera to a video processor and target selector which eliminates the synchronization and blanking pulses and filters out unwanted video signals. The video processor also converts the video signals to a unipolar form so that all of the signals, regardless of their initial dynamic contrast polarity, end up as video signals of a single polarity. The target width discriminator is utilized to eliminate video signals of less than a critical predetermined pulse width, leaving only the video signals representing the major portions of the target. These signals are utilized to control the dimensions of the window so that it fully accommodates the selected target portions and accommodate to changes in these dimensions. Means are provided to maintain the window in a square configuration whereby the size of the square is determined by the greatest dimension of the target. The tracking window signal as adapted to the target size is fed to the video processor and target selector which utilizes this window signal to eliminate all video signals but those contained within the window. A vertical gate generator and error detector and a horizontal gate generator and error detector respectively receive signals representing the vertical and horizontal dimensions of the target respectively. These circuits operate to generate the tracking gate window and to provide error signals whenever the target tends to drift out of this window. These error signals are utilized to drive a tracking servo to maintain target lock-on.

Figure 1:
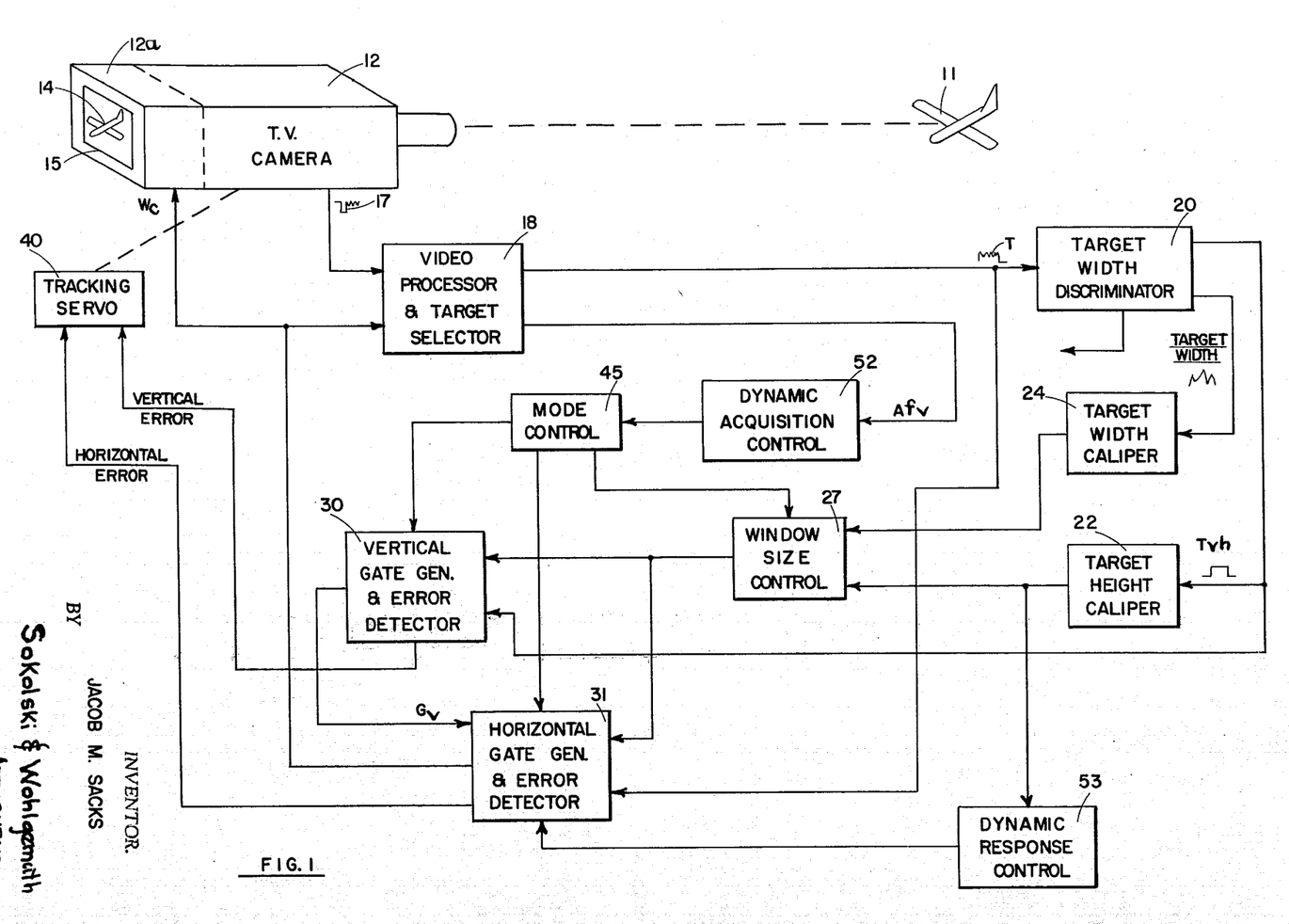
FIG. 1 is a block diagram illustrating the system of the invention.

Referring now to FIG. 1, a general block diagram of the system of the invention is shown. Television camera 12 is trained on target 11 so as to produce a video image 14 of the target which appears within tracking gate window 15 on the camera monitor 12a. Raw video signals 17 representing the target, background and other video images within the field of the television camera, are fed from the camera to video processor and target selector 18. Video processor and target selector includes circuitry, as to be explained further on in the specification, which eliminates the synchronization and blanking pulses which accompany the raw video and provides band pass filtering to effectively eliminate background and other extraneous video signals. The video processor and target selector also converts the video signals to a single polarity, thereby providing a unipolar video output, T, which provides this single polarity video signal for light targets appearing against a dark background, and dark targets appearing against a light background. A signal representing the dimensions of the window, $w_c$ is fed to video processor and target selector 18 from horizontal gate generator and error detector 31. This window signal acts as a gate to eliminate all video signals in the output of the video processor and target selector but those video signals which have time coincidence with the gate, i.e., fall within the tracking gate. The target signal T thus only involves video signals which fall within tracking gate 15.

Target signals, T, are fed to target width discriminator 20 wherein pulses of less than a predetermined critical width are filtered out to provide a single target for a plurality of horizontal scan lines which represent the vertical centroid or main body of the target. It is to be noted at this point the target signal, T, represents all target portions in successive scan lines which fall within the target window, the target width discriminator now in effect integrating the successive video pulses into a single signal which represents the vertical extent of the main body of the target portions which fall within the window.

The output of target width discriminator 20 which represents the main vertical body of the target or the target height, is fed to target height caliper 22 which generates a signal which is an analog representing the height of the target. A signal is also fed from target width discriminator 20 to target width caliper 24, this signal representing the integration of the signals, T, received from the video processor and target selector. Target width caliper operates in the same manner as target height caliper and generates an analog signal indicative of the width of the target. The outputs of target height caliper 22 and target width caliper 24 are fed to window size control 27 which selects the greater of these two signals and utilizes it as a window size parameter and tracking gate reference. The window thus is in the form of a square which has a side dimension governed by the greater of the two measured dimensions of the target.

Signals in accordance with window size are fed to vertical gate generator and error detector 30 and horizontal gate generator and error detector 31. Horizontal gate generator and error detector 31 receives target signals T, representing targets within the window gate on successive horizontal scan lines. The error detector compares the gate signal, as generated in response to the window signal, for time coincidence with the target signals T, and provides a horizontal error signal representing any difference detected in such time coincidence, this signal being fed to tracking servo 40. Similarly, vertical gate generator and error detector 30 develops a signal representing vertical error by comparing its gate signal in accordance with the window for time coincidence with signals representing the height of the target, T$vh$, received thereby and feeds a signal to tracking servo 40 indicative of any vertical error.

Tracking servo 40 responds to error signals to appropriately slew television camera 12 to maintain the target within the tracking window at all times. The vertical gate signal, G$v$, is fed from vertical gate generator and error detector 30 to horizontal gate generator and error detector 31 where a composite gate signal W$_c$ is developed and fed to the TV monitor 12a as well as video processor and target selector 18.

The operating mode of the system is controlled by means of mode control 45, one of these two modes being a caged mode during which the window 15 is fixed in position and size, generally in the center of the monitor screen, and during which the tracking loops are disabled. During this mode of operation, the target is acquired by the operator. The other mode of operation is the tracking mode during which the target is locked in the window and is automatically tracked by the camera. The operator manually operates mode control 45 to switch from the caged to the tracking mode when he has a target within the window and wishes to track same. Under such conditions, the automatic tracking operation of window size control 27, horizontal gate generator and error detector 31, and vertical gate generator and error detector 30 are implemented. Such switching from the caged to the tracking mode can also be automatically implemented by means of dynamic acquisition control 52 which in response to video signals, A$fv$, of over a predetermined magnitude received from video processor and target selector 18 automatically operates mode control 45 to enter a tracking mode. Such automatic implementation is useful to assure the commencement of the tracking of obvious targets at the earliest possible moment without the necessity for manual switchover by the operator.

Dynamic response control 53 is utilized to provide an automatic gain control signal for horizontal gate generator and error detector. In implementing such operation, dynamic response control 53 receives a signal from target height caliper in accordance with the height of the target and generates a signal which controls the gain of the horizontal tracking loop in inverse relationship to such height.

Figure 2:
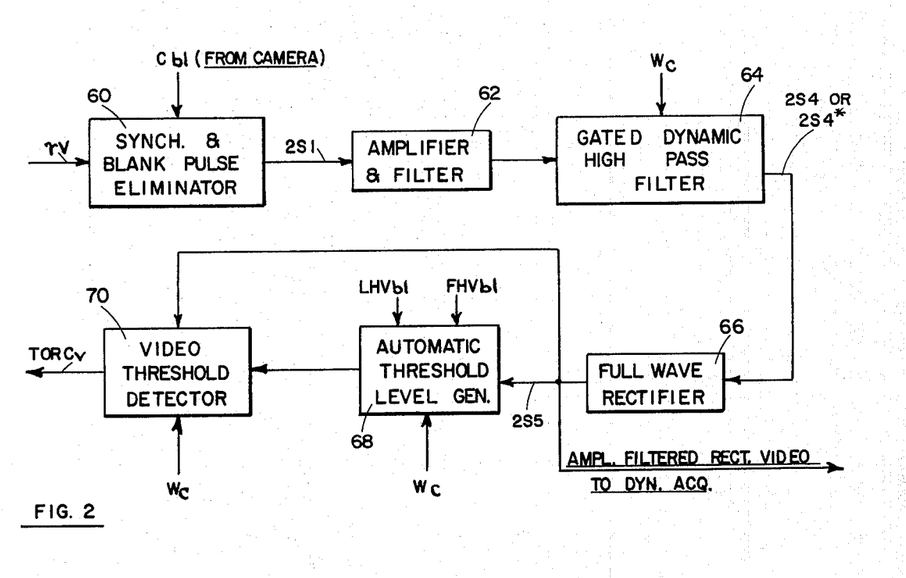
FIG. 2 is a functional block diagram of a video processor which may be utilized in the system of this invention.

Referring now to FIGS. 2 and 3, a functional block diagram and wave form illustrations pertinent thereto are respectively illustrated. Raw video (rv) from the television camera, which includes blanking and synchronization pulses as well as other video signals, is fed to sync and blank pulse eliminator 60. Sync and blank pulse eliminator 60 also receives the composite blanking signals (Cbl) from the television camera as a gating signal and utilizing conventional gating techniques gates out all the sync and blanking pulses and other signals appearing during the vertical and horizontal blanking intervals. This circuit also removes the DC component of the raw video. The output of sync and blank pulse eliminator 60, which is labeled in FIG. 2 as 2S1 for convenience of identification, is shown in FIG. 3B. As can be seen, this includes negative going and positive going video components representing "dark" and "light" video respectively.

These signals are fed to amplifier and filter 62 where they are appropriately amplified to the maximum extent permitted by the practical dynamic range limitations of the amplifier and in addition, their video band width restricted to the minimum value consistent with desired video resolution capability, thereby minimizing high frequency video noise. The output of amplifier and filter 62 is fed to gated dynamic high pass filter 64. Gated high pass filter 64 also receives the window control signal (W$_c$) illustrated in FIG. 3C. Dynamic high pass filter 64 operates to differentiate the video signals in such a manner that short duration or high frequency signals are passed through without any significant distortion, while the lower frequency signals are effectively differentiated. The window signal, $W_C$, is utilized to gate off the differentiation operation of the filter during the window time so that signals within the window will not be affected by such differentiation, and thus will retain their full average amplitude. This gate thus operates in effect to disable the operation of the high pass filter circuitry during the window time, or to put it in another way, bypasses the signal around the filter during this period.

Figure 3A:
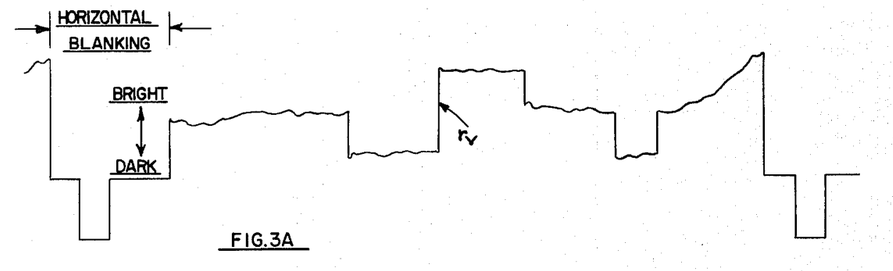
FIGS. 3A-3H are a series of wave forms illustrating the operation of the video processor of FIG. 2.
Figure 3B:
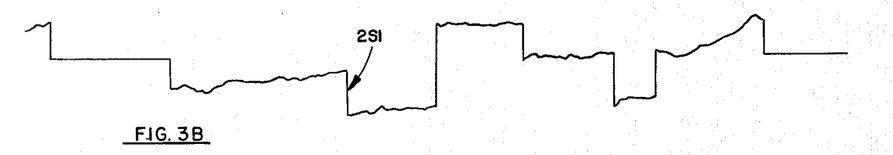
Figures 3C, 3D:
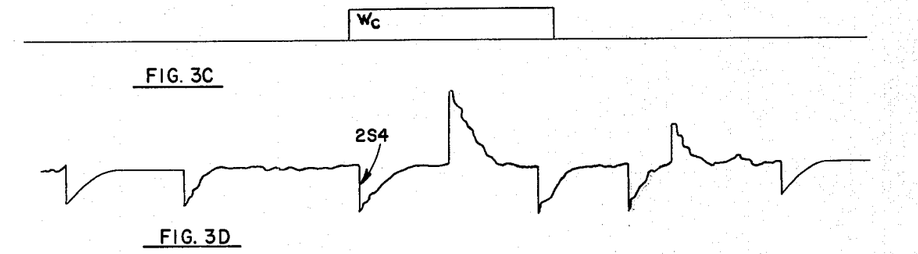
Figure 3E:
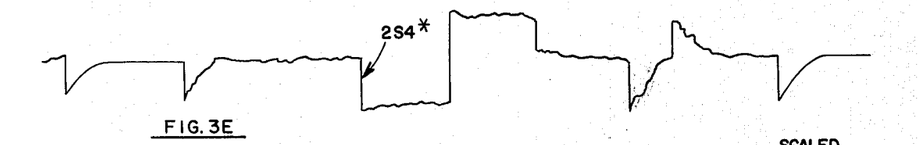

The dynamic high pass filter operates to discriminate against background gradient, minimizing the video effects of large target signals and certain types of noise, such as background shading or a gradient having greater concentrations of energy in the lower frequency spectrum. This effectively facilitates the detection of smaller targets. It is of course necessary that targets being tracked, that is, falling within the window, not suffer the distortion imposed by differentiation. Therefore, during the tracking mode the window signal is utilized to gate off the differentiation during window time. FIG. 3D illustrates the differentiated output of gated dynamic high pass filter 64 without gating, this signal being identified as 2S4, while FIG. 3E illustrates the signal output with window gating, this signal being identified as 2S4. The establishment of a stable signal reference base line by the gated dynamic high pass filter makes it possible to track targets of either contrast polarity without manual selection. It also becomes possible to track targets containing bright and dark areas at the same time even while these patterns change dynamically in area, amplitude and geometric shape.

Figures 3F, 3G:
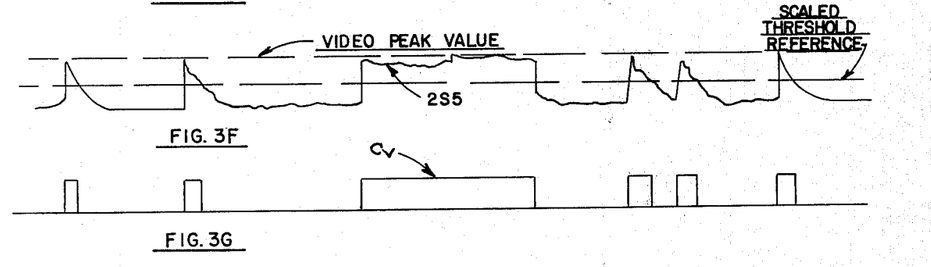

The output of gated dynamic high pass filter 64 is fed to rectifier 66, which rectifies video signals to produce a unipolar output signal as illustrated in FIG. 3F and identified as 2S5. Both polarities are given an equal weight in the rectification, which is full wave, the output signal thereof 2S5 being a signal having no contrast polarity, i.e., dark signals against light backgrounds and light signals against dark backgrounds, both being shown in the same polarity. This is a rather significant function in that it simply yet effectively eliminates problems heretofore encountered in maintaining target lock-on with shifts in contrast polarity.

The output of full wave rectifier 66 is fed to automatic threshold level generator 68. The automatic threshold level generator receives the window control signal, $W_c$, which provides a gating signal for a peak detector in this unit to enable the threshold level generator to store a signal in accordance with the peak value of the video during window time. This signal is stored for the duration of the scanned field (vertical scanning interval) during which it was measured and then sampled during the first half of the vertical blanking interval, this sampling being implemented by means of the first half of vertical blanking pulse (FHVB1), (see FIG. 5A) received from the television camera. Each such sample is held for the next consecutive scanned field during which time it is fed to the video threshold detector 70. After each sampling period has been completed, this peak value is discharged by the last half of the vertical blanking pulse (LHVB1) (see FIG. 5B) received from the television camera, so that an updated peak during reading of the video during window time is obtained and stored while the previous value is being utilized.

The automatic threshold level generator 68 also includes a scaling circuit, the purpose of which is to fractionally divide the stored peak video signal in an optimum way. This scaling is accomplished by means of a signal controlled resistive voltage divider which provides a scaling ratio as a discrete function of window size. When tracking small targets in small windows, the scale down factor is relatively large. conversely, when targets are large a greater proportion of peak signal amplitude is used as a reference level. This type of inverse scaling is utilized in view of the fact that as the target occupies more of the raster, edge shading components within the window assume greater significance for performance degradation. Thus it is desirable that the threshold reference value be a greater proportion of the peak video signal to minimize the possibility that shading or other spurious noise signals will cross the detection threshold.

Figure 3H:
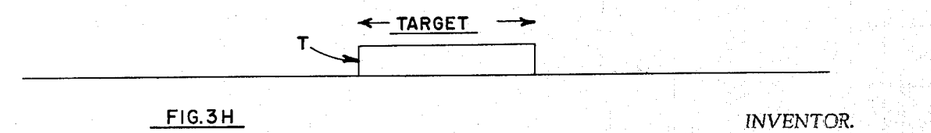

The output of automatic threshold level generator is a scaled threshold reference signal, which is shown in FIG. 3F and is labeled as such. This signal is fed to video threshold detector 70 where it is compared with the rectified output of full wave rectifier 66 (2S5, see FIG. 3F). Video threshold detector 70 comprises an amplitude limiter that squares the signals and performs negative clipping at the scaled threshold reference level. A window control signal, $W_c$, is fed to video threshold detector 70 which, during lock-on, effectively gates out all video signals but those appearing during window time. These video signals are identified as T and are illustrated in FIG. 3H. This signal which represents the target video within the tracking window is utilized extensively throughout the computer. At times other than lock-on, when the window control signal, $W_c$, is not present, the output of video threshold detector 70 includes all of the video signals present which are above the scaled threshold reference level as squared, these signals being illustrated in FIG. 3G and identified as $Cv$.

Figure 4:
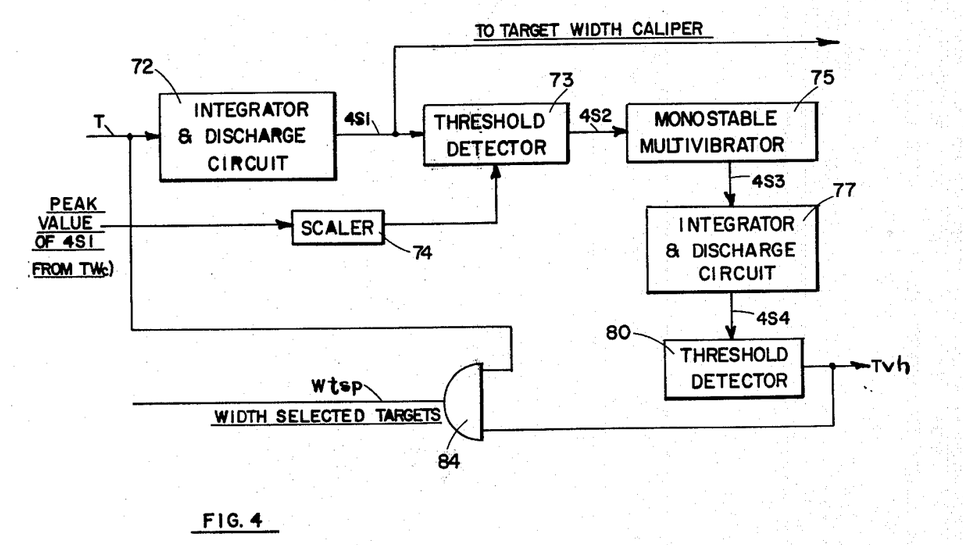
FIG. 4 is a functional block diagram of a target width discriminator which may be utilized in the system of the invention.

Referring now to FIGS. 4 and 5, a functional block diagram of the target width discriminator of the system of the invention and wave forms pertinent thereto are respectively shown. The target width discriminator operates to reject spurious pulses contained in the output, T, of video processor and target selector 18 on the basis of pulse duration. Pulses which are shorter than half the duration of the longest pulses are considered unusable and are therefore eliminated from the signal.

As an example, consider the case of an aircraft which appears on the television screen as viewed from above or below, i.e., such as the wings and tail section are clearly distinguishable from the fuselage. Assume that the aircraft image is horizontally oriented on the raster. Superior tracking will result if tracking error signals are derived only from the fuselage, which is the main body of the aircraft and which has a clearly defined centroid. Video signals from appendages, such as wings or tail surfaces do not improve centroid determination tracking but merely add noise to the signal. The target width discriminator operates to reject target pulses, T, representing these appendages which are short in comparison with the target pulses T received from the fuselage. Further, target pulses derived from small background objects and noise spikes are also eliminated in the target width discriminator. The output of the target width discriminator is a train of pulses, each of which has a duration approximately equal to the vertical height of a corresponding portion of the target image.

Figure 5A:
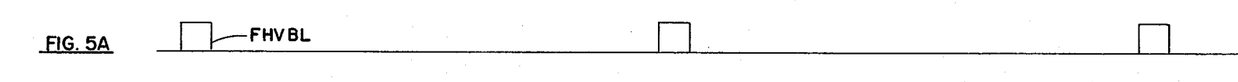
FIGS. 5A-5I are a series of wave forms illustrating the operation of the target width discriminator of FIG. 4.
Figure 5B:
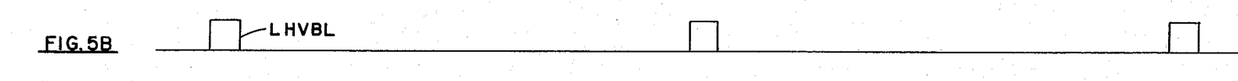
Figure 5C:
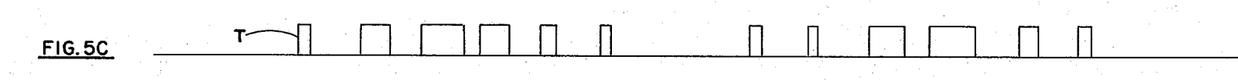

Again specifically directing our attention to FIGS. 4 and 5, the target signals, T, which are shown in FIG. 5C and represent the target pulses falling within the target window on successive horizontal scan lines are fed to integrator and discharge circuit 72. The integrator and discharge circuit 72 comprises a linear integrator which separately integrates each of the target pulses and then discharges rapidly at the termination of such target pulses. The output of integrator and discharge circuit 72 comprises a series of ramps as shown in FIG. 5D and identified as "4S1". The integrated signals rise linearly during the duration of their corresponding pulses, T, so that the amplitude of each ramp is proportional to the duration of its associated pulse, T.

Figure 5D:
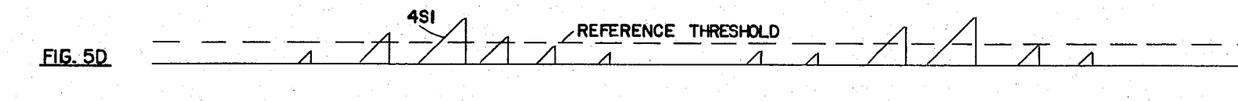
Figure 5E:
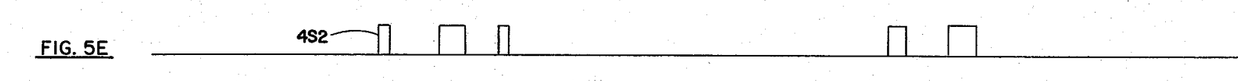

The series of ramps illustrated in FIG. 5D enter threshold detector 73 where a comparison is made with a DC reference signal equal to a fixed fraction of the peak amplitude of all of the ramp signals measured during the preceding scanned field. The reference signal is generated by scaling the peak values of the ramp signals, 4S1, taken from the target width caliper 24, in scaler 74. The scaling factor is nominally one half of this peak amplitude and is indicated in FIG. 5D as the "Reference Threshold". Threshold detector may comprise a peak voltage detector and scaler 74 a resistive network for scaling the voltage from the target width caliper. The threshold detector may also include a gating circuit, the threshold of which is established by the output of scaler 74 and which operates to gate through only outputs of the peak voltage detector which are above this threshold level. Threshold detector thus eliminates all of the targets which fall below the reference threshold level and has as its output square wave pulses corresponding to the signals above the reference threshold as shown in FIG. 5E and designated "4S2".

Figures 5F, 5G:
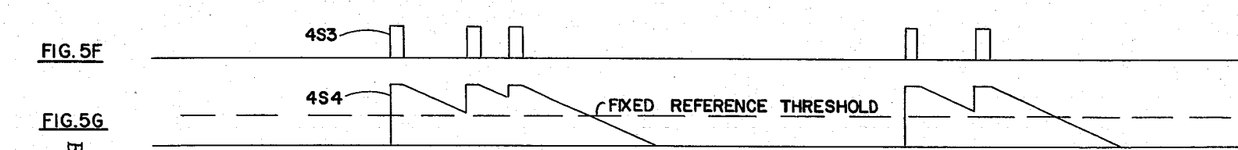

The square wave pulses (4S2) from threshold detector 73 are fed to monostable multivibrator 75 which is adapted to be triggered by the trailing edges of the pulse inputs thereto, the trigger signals being developed in an appropriate differentiator circuit in the input of the multivibrator. The output of monostable multivibrator 75 is a plurality of pulses of uniform width and height which are initiated with the trailing edges of the pulses 4S2 shown in FIG. 5E. These pulses are designated 4S3 and are illustrated in FIG. 5F.

Figure 5H:
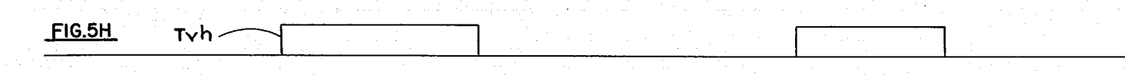

The pulses 4S3 are fed to integrator and discharge circuit 77. Integrated and discharge circuit 77 has a linear integrating circuit which is discharged in response to pulses 4S3 and then linearly recharges between the pulses 4S3. With the output of this charge-discharge circuit in the input of an inverting amplifier, the signal indicated as 4S4 illustrated in FIG. 5G is generated. The output, 4S4, of integrator and discharge circuit 77 is fed to threshold detector 80 where it is compared with a fixed DC reference, this fixed reference threshold being shown in FIG. 5G. Threshold detector 80 thus may comprise an amplifier biased to respond only to signals above the threshold level, operating in conjunction with a squaring circuit which produces a square wave signal, T$vh$, as shown in FIG. 5H, signal, T$vh$ has a width or duration which corresponds to the total duration of all the signals in the vertical field which are above the fixed reference threshold.

The output of threshold detector 80, T$vh$, includes target vertical height pulses representing the centroid of the target, the minor target pulses having been eliminated as just described. It is to be noted that the T$vh$ pulses are always delayed in time by approximately 1 scan line with respect to the group of significant pulses, T. This delay has no adverse effect on performance for any targets of consequence. The centroid of each pulse, T$vh$, closely approximates the vertical centroid of the target.

Figure 5I:
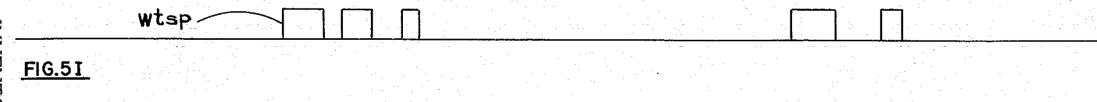

The T$vh$ pulse output of threshold detector 80 is fed to AND gate 84 along with target pulses, T. The output of AND gate 84 includes the width selected targets designated Wtsp, as shown in FIG. 5I. The selected T pulses, Wt$sp$, thus correspond to the scanned main body of the target image, with most unwanted signals caused by wings in the case of an aircraft, or other small appendages, and noise or background pulses effectively eliminated. FIGS. 5A and 5B illustrate the left hand portion and the right hand portion respectively of the vertical blanking pulses, this to serve as a reference for the other pulses displayed in FIGS. 5C–5I.

Figure 6:
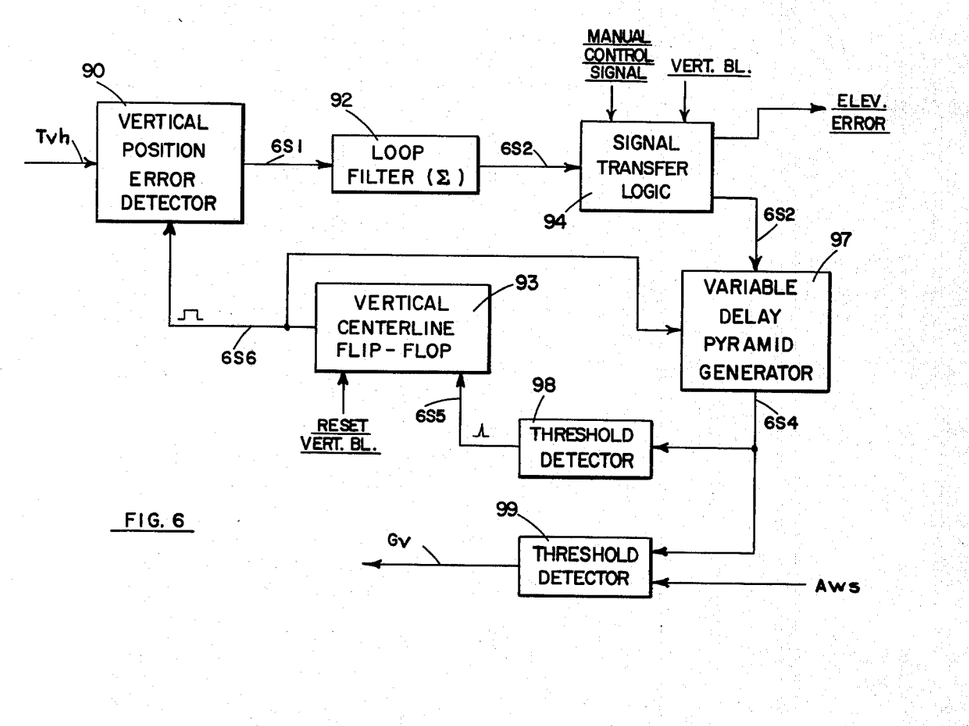
FIG. 6 is a functional block diagram illustrating a vertical gate generator and error detector which may be utilized in the system of the invention.

Referring now to FIGS. 6 and 7, the vertical gate generator and error detector of the system of the invention and wave forms pertinent thereto are illustrated respectively. It is first to be noted that the tracking window comprises a logical product of a size adaptive horizontal gate and a size adaptive vertical gate. Each of these gates is independently positionable anywhere in the raster regardless of gate size. Two modes of operation are provided whereby the gates may be moved. In the "caged" mode, the gates are manually positionable by the operator, although for most applications a fixed window position in the center of the scanned field of view is sufficient. In the "track" mode, the window is movable under closed loop control, which forces the window to track the target. The control signal to implement the vertical positioning of the window in the control loop is accomplished by means of the vertical gate generator and error detector.

Referring now specifically to FIGS. 6 and 7, vertical height pulses identified as T$vh$ which represent the vertical height of the significant targets as developed in the target width discriminator, are fed to vertical position error detector 90. This signal is illustrated in FIG. 7B. Vertical position error detector also receives a vertical center line pulse which, as to be explained further on, is generated in vertical centerline flip flop 93. The vertical centerline pulse identified as 6S6, which is illustrated in FIG. 7C, indicated the vertical gate position in the raster of the field of view and is compared in the vertical position error detector 90 with the target signals, T$vh$. The relative time of occurrence of T$vh$ with respect to the centerline edge of V$cl$ (6S6) determines the time at which the T$vh$ signal is divided polaritywise.

Vertical position and error detector 90 may comprise, for example, a flip flop which is triggered to one state by the leading edge of T$vh$ and to the opposite state by the trailing edge of V$cl$. The output of vertical position error detector is designated 6S1 and is illustrated in FIG. 7D. As to be noted in the case of the first of the signals, 6S1, shown in FIG. 7D, the loop is not in a situation of track equilibrium due to the asymmetry of the positive and negative portions of the flip flop output. This provides an error signal which is now to be explained restores equilibrium, as shown in the second and third wave forms of FIG. 7D. It is to be noted that with such equilibrium, the signal 6S1 is symmetrical and the trailing edge of V$cl$ lies in the center of T$vh$.

Figures 7A, 7B:
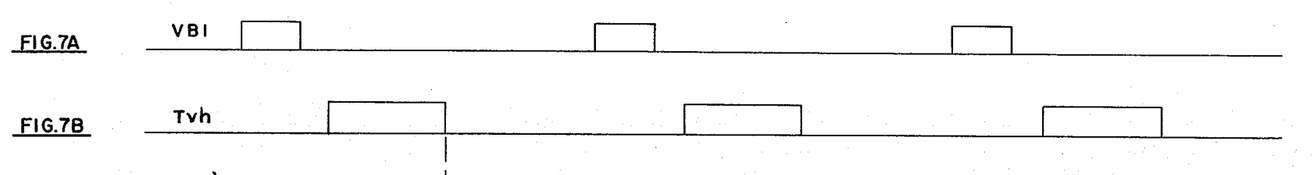
FIGS. 7A-7H are a series of wave forms illustrating the operation of the vertical gate generator and error detector of FIG. 6.
Figure 7C:
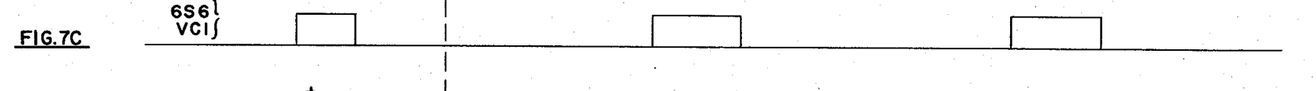
Figure 7D:
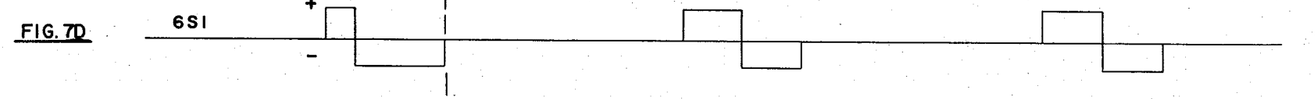
Figures 7E, 7F, 7G:
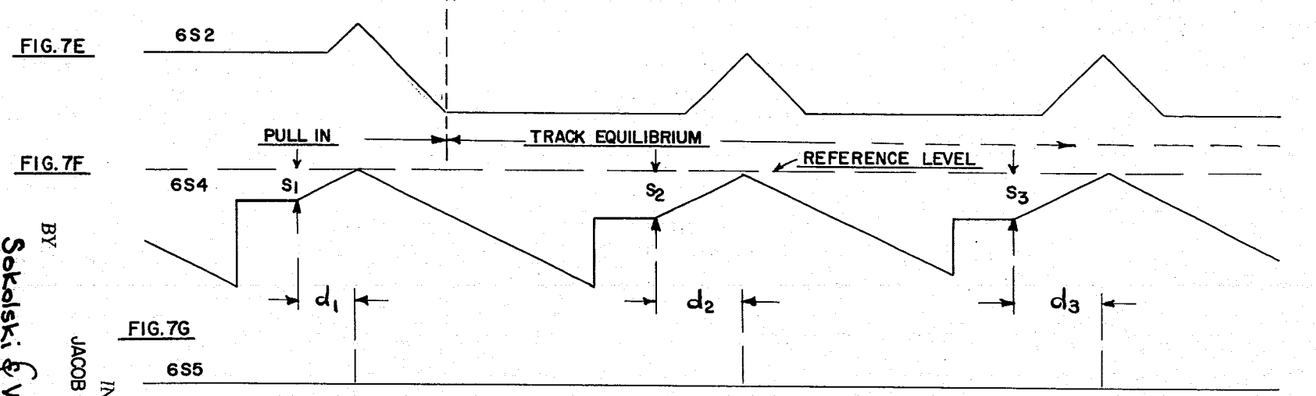

The signals, 6S1, are fed to loop filter 92 which comprises an integrator circuit integrating the signals to provide an output designated 6S2 as illustrated in FIG. 7E. The signal 6S2 which carries the error signal is fed to signal transfer logic 94, which comprises control circuitry for implementing the caged and tracking modes of operation. Signal transfer logic 94 thus responds to a manual control signal fed thereto from mode control 45 (FIG. 1).

When a command signal is received, commanding the system to operate in a caged mode, vertical position data from a manually controlled source are entered into variable delay pyramid generator 97, during vertical blanking (a vertical blanking signal as shown in FIG. 7A is also fed to signal transfer logic 94). This causes the variable gate generator and error detector to operate open loop with the window normally remaining in the center of the field of view.

When the tracking mode is initiated by virtue of the manual control signal, samples of the integrated vertical error signal, 6S2, are fed into the variable delay pyramid generator during vertical blanking time. The variable delay pyramid generator which may comprise a linear integrating circuit, starts integrating in a positive direction in response to the leading edge of the vertical centerline pulse, 6S6, fed thereto from the vertical position error detector 90, and starts to integrate in a negative direction is response to the trailing edge of the vertical centerline signal. It is to be noted, however, that this is a bootstrap type operation in view of the fact that vertical centerline flip flop is triggered by the output of threshold detector 98 in the following manner: Threshold detector 98 comprises a peak detector, the output of which is fed to a comparator circuit which compares this peak signal with a reference level which may, for example, comprise a zero voltage. When the amplitude of signal 6S4, as indicated in FIG. 7F, reaches the reference level, the threshold detector provides a trigger signal which triggers a pulse generator which may, for example, comprise a monostable multivibrator. This produces a sharp trigger pulse, designated 6S5 and illustrated in FIG. 7G. Trigger pulse 6S5 is fed to vertical centerline flip flop 93 and operates to trigger this flip flop to an opposite state. It is to be noted that vertical centerline flip flop 93 is initially "reset" by the trailing edge of the vertical blanking pulse, VB1 shown in FIG. 7A, to generate the leading edge of the centerline pulse. The output signal of the vertical centerline flip flop 93, as already noted, is fed to the variable delay pyramid generator and thus as soon as it changes state, initiates the negative integration mode of the pyramid generator as illustrated in FIG. 7F.

Thus, by this closed loop bootstrap operation, each sample of signal 6S2 provides an initial starting point for the pyramid wave form 6S4, this representing the error signal voltage transferred during vertical blanking to the pyramid generator 97. The time required for linear increase of 6S4 from its initial value at the end of each vertical blanking period to its turnover point at ground reference level is determined by the initial value. Thus the apex of the "pyramid" (and the vertical centerline which coincides with it) is positioned in time by each updated initial value received during the vertical blanking interval. This can be clearly seen by reference to FIG. 7F. Thus, the vertical position error detector, the vertical loop filter, the signal transfer logic, the variable delay pyramid generator, the threshold detector and the vertical centerline flip flop form a gate position control loop. This loop, of course, remains open when operating in the caged mode. The signal, 6S2, illustrated in FIG. 7E, thus is a measure of vertical gate position in the raster of field of view and is fed through signal transfer logic 94 from where it is provided as an elevation error signal to the tracking servo 40.

Figure 7H:
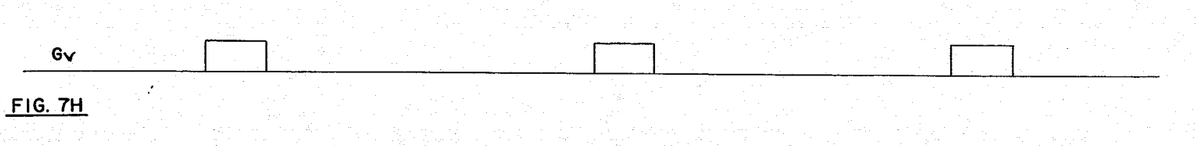

The pyramid signal, 6S4, is also fed to threshold detector 99 where it is compared with a signal in accordance with window size, Aws, received from window size control 27. The output of threshold detector 99 is a vertical gate, Gv, as illustrated in FIG. 7H, having a duration representing the height of the tracking window and which is bisected by the vertical centerline. This signal is fed to horizontal gate generator and error detector 31 (FIG. 1) where it is "ANDED" with the horizontal component of the tracking window, this logical product resulting in the composite tracking window, $W_c$.

The horizontal gate generator and error detector 31 operates in the same fashion as the vertical gate generator and error detector just described, in this instance of course to generate the horizontal error signal. It, therefore, need not be described in detail except to note that the timing operations in the horizontal gate generator and error detector are synchronized to the line frequency rather than to the field frequency and that the horizontal position error detector receives a video signal, T, which contains both a horizontal and vertical component. Therefore, it is necessary to control the gain and damping parameters of the horizontal gate position control loop as a function of vertical target size. Specifically, horizontal loop gain is caused to vary inversely with window height, thus compensating for increases which are induced by changing target height. A horizontal error signal is generated in horizontal gate generator and error detector which is fed to tracking servo 40. Also, a series of pulses which represent the horizontal component of the tracking window are developed, these pulses as already noted being ANDED with the vertical gate pulses received from the vertical gate generator and error detector, the logical product of these two signals resulting in the composite tracking window, $W_c$.

Figure 8:
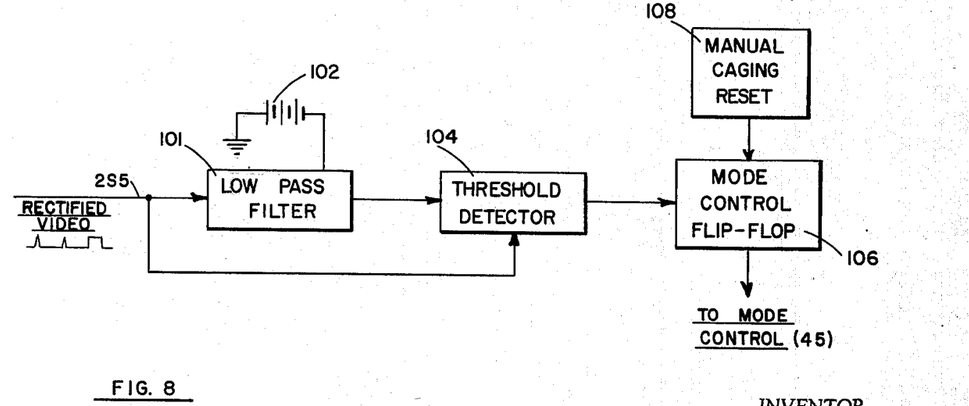
FIG. 8 is a functional block diagram illustrating a dynamic acquisition control which may be utilized in the system of the invention.

Referring now to FIG. 8, the dynamic acquisition control of the system of the invention is schematically illustrated. To acquire a target, the target must first enter the field of view and upon visual detection by the operator, must be manually maneuvered into the tracking window. The operator must then switch manually from the caged to the tracking mode at the precise moment that the target enters the window. During the search and acquisition period, the window remains fixed at its smallest size and is stationary in the center of the field of view as it appears on the television monitor. The target image meanwhile is moving in the field of view due to its own motion as well as the relative motion resulting from the manual slewing of the camera. If this motion is relatively rapid, it places demands on the coordination of the operator to acquire the target. The dynamic acquisition control is utilized to alleviate this problem. This device, while not a true automatic acquisition device, greatly facilitates the acquisition of a target. The dynamic acquisition control essentially comprises means for detecting the entrance of a target having greater than a predetermined contrast with its background into the caged window and thereupon generating a command signal for changing the operating mode from "caged" to "track".

Referring now specifically to FIG. 8, filtered and rectified video (2S5) as shown in FIG. 3F, is fed from video processor and target selector 18 to low path filter 101 which smooths the video so as to effectively attenuate all fluctuations, producing an output signal which is a relatively constant DC, whose value is approximately equal to the average background level. A fixed bias is added to the signal by means of bias source 102. The output of low path filter 101 establishes a threshold level for threshold detector 104. Threshold detector 104 also receives the rectified video signal 2S5 as an input thereto. Threshold detector 104 produces an output to mode control flip flop 106 only when the rectified video signal 2S5 exceeds the threshold level established by the output of low path filter 101. The output of threshold detector 104 is a pulse which actuates mode control flip flop 106 such as to produce an output to the mode control 45, which shifts operation over to the "track" mode. Mode control flip flop 106 is reset by means of manual caging reset 108 to bring the system back to a "caged" mode of operation when so desired.

The dynamic acquisition control thus greatly facilitates the process of acquiring a target. The operator no longer need time his manual command to change mode precisely, with the possibility that the window will not capture the target. He merely maneuvers the optics until the target image contacts the cage window whereupon the mode change is automatically implemented.

The system of this invention thus enables the accurate tracking of an optical target with the target image being obtained by means of a television camera. Target-background contrast for both polarities is adapted to provide a unipolar video signal for both types of contrasts. Further, means are provided in the system to effectively filter out and eliminate all video signals but those pertaining to significant targets. Means are further provided to facilitate the acquisition and tracking of such targets.

I claim:
1. In combination:
   a television camera for generating bipolar video signals representing targets within its field of view, said camera including a video monitor,
   means for full wave rectifying said signals to convert them to unipolar form,
   means for generating a tracking gate,
   means for automatically controlling the dimensions of said gate in accordance with the dimensions of one of said video signals representing a selected target,
   means for eliminating video signals of less than a predetermined width,
   means for comparing said gate and said signals representing a selected target for time coincidence, and generating error signals whenever they tend to drift out of coincidence, and
   tracking servo means responsive to said error signals for slewing said camera so as to minimize said error signals.

2. The combination of claim 1 and further including means for eliminating video signals not in time coincidence with said gate.

3. The combination of claim 1 wherein said means for generating error signals includes a horizontal error detector for comparing horizontal video signals for time coincidence with a horizontal gate and a vertical error detector for comparing vertical signals for time coincidence with a vertical gate.

4. The combination of claim 1 and further including means responsive to said gate for generating a window signal for display on said monitor.

5. The combination of claim 4 wherein said means for generating a window signal is adapted to generate a square window in accordance with the greatest of the horizontal and vertical dimensions of said selected target.

6. The combination of claim 4 and further including means for switching to a caged mode of operation wherein said window signal is fixed in size and position on said monitor.

7. In a tracking computer,
   a television camera for generating bipolar video signals in accordance with targets within its field of view, said camera including an optical monitor,
   means for full wave rectifying said video signals to convert them to unipolar form,
   means for eliminating signals of less than a critical pulse width from said unipolar video signals, leaving only signals representing the major portion of a selected target,
   means responsive to said signals representing the major portion of said target for automatically generating window control signals in accordance with the dimensions of said major portions of said target,
   means responsive to said window control signals for generating window signals for display on said monitor,
   means responsive to said window control signals for eliminating video signals not in time coincidence therewith, said time coincident signals representing the major portion of said target,
   means for generating a threshold reference signal in accordance with the peak of said time coincidence signals which is scaled in response to a signal in accordance with the size of said window signals,
   threshold detector means receiving said video signals and said threshold level signal for positive and negative limiting said video signals in accordance with said threshold reference signal, and
   means for generating error signals whenever said window signals and said signals representing the major portion of said target to drift out of time coincidence with each other.

8. The tracking computer of claim 7 wherein said means for generating window control signals includes means for generating equal horizontal and vertical window control signals in accordance with the greatest of these two dimensions of the major portion of said target.

9. The computer of claim 7 and further including means for switching said computer to a caged mode of operation wherein said window control signals are fixed in size and position.

10. The computer of claim 7 and further including dynamic acquisition means for automatically switching from caged operation to tracking operation whenever the video signals having time coincidence with said window signal exceed a predetermined level.

11. In a tracking computer,
    a television camera for generating video signals in accordance with targets within its field of view, said camera including a video monitor, said camera being adapted to be trained onto a target,
    means for generating an optical window, said window being displayed on said monitor, mode control means for alternatively caging said window on said monitor in a fixed position and size or permitting said window to function as a tracking gate, video processor and target selector means for full wave rectifying said video signals to convert them to unipolar form and for eliminating signals not arriving in time coincidence with said window, target width discriminator means receiving the output of said video processor and target selector means for eliminating video signals of less than a predetermined pulse width leaving only signals representing the major portion of the target, window size control means responsive to said signals representing the major portion of the target for automatically controlling the dimensions of said window to accommodate the major portion of the target, error detector means for comparing said signals representing the major portion of the target with said window and for generating error signals whenever they tend to drift out of time coincidence with each other, and tracking servo means responsive to said error signals for slewing said camera to minimize said error signals.

12. The computer of claim 11 wherein said window size control means comprises means for generating equal horizontal and vertical window portions in accordance with the greatest of these two dimensions of the major portion of the target.

13. The computer of claim 11 and further including dynamic acquisition means for automatically switching from caged operation to tracking operation whenever video signals falling within the window exceed a predetermined level.

14. The computer of claim 11 wherein said size control means includes means for generating signals in accordance with the horizontal and vertical dimensions of the major portion of the target respectively and means for generating a composite window control signal in accordance with the greater of these two dimensions.

15. The computer of claim 14 wherein said error detector means comprises separate horizontal and vertical error detectors for generating horizontal and vertical error signals respectively.

16. The computer of claim 15 and further including dynamic response control means for controlling the gain of said horizontal error detector means in inverse relationship to the height of the major portion of the target.

* * * * *